(12) United States Patent
Onishi et al.

(10) Patent No.: US 7,249,713 B2
(45) Date of Patent: Jul. 31, 2007

(54) ARTICLE WITH TWO OR MORE BAR CODES

(75) Inventors: Kazuo Onishi, Shizuoka (JP); Masaki Ito, Shizuoka (JP)

(73) Assignee: Fujifilm Corporation, Tokyo (JP)

( * ) Notice: Subject to any disclaimer, the term of this patent is extended or adjusted under 35 U.S.C. 154(b) by 0 days.

(21) Appl. No.: 10/901,956

(22) Filed: Jul. 30, 2004

(65) Prior Publication Data

US 2005/0087611 A1    Apr. 28, 2005

(30) Foreign Application Priority Data

Jul. 31, 2003   (JP)   ............................. 2003-284002

(51) Int. Cl.
  *G06K 7/10*   (2006.01)
(52) U.S. Cl. ................................. 235/462.01
(58) Field of Classification Search ........... 235/462.01, 235/375, 487, 385, 494; 283/81, 101
  See application file for complete search history.

(56) References Cited

U.S. PATENT DOCUMENTS

| | | | | |
|---|---|---|---|---|
| 5,025,397 A | * | 6/1991 | Suzuki ...................... 358/1.18 |
| 5,294,202 A | * | 3/1994 | Sawada et al. ............. 400/103 |
| 5,367,148 A | * | 11/1994 | Storch et al. ............... 235/375 |
| 5,617,481 A | * | 4/1997 | Nakamura .................. 382/101 |
| 5,661,289 A | * | 8/1997 | Sasou et al. ................. 235/449 |
| 5,984,174 A | * | 11/1999 | Kato et al. ................... 235/375 |
| 6,029,889 A | * | 2/2000 | Whalen et al. ............. 235/380 |
| 6,086,108 A | * | 7/2000 | Rosenberger ................ 283/81 |
| 6,098,892 A | * | 8/2000 | Peoples, Jr. ................. 235/494 |
| 6,360,001 B1 | * | 3/2002 | Berger et al. ............... 382/101 |
| 6,376,057 B1 | * | 4/2002 | Akao et al. ................. 428/215 |
| 6,484,943 B1 | * | 11/2002 | Reber et al. ........... 235/462.15 |
| 6,550,685 B1 | * | 4/2003 | Kindberg .................... 235/494 |
| 6,666,377 B1 | * | 12/2003 | Harris .................... 235/462.25 |
| 6,736,324 B2 | * | 5/2004 | Behm et al. ................. 235/487 |
| 6,764,011 B2 | * | 7/2004 | Entani .................... 235/462.25 |
| 6,779,727 B2 | * | 8/2004 | Warther .................. 235/462.01 |
| 2002/0080395 A1 | * | 6/2002 | Kurashina ................... 358/1.15 |
| 2003/0080191 A1 | * | 5/2003 | Lubow et al. ......... 235/462.01 |

* cited by examiner

*Primary Examiner*—Thien M. Le
*Assistant Examiner*—Edwyn Labaze
(74) *Attorney, Agent, or Firm*—Sughrue Mion, PLLC

(57) ABSTRACT

A first character string is displayed in the vicinity of a first bar code in a state that the first character string can be readily recognized as a character string represented by the first bar code, and all or a part of the second character string is displayed in a state that it cannot be readily recognized as all or a part of a character string represented by the second bar code. When an article on which two or more bar codes and two or more character strings corresponding thereto are displayed is viewed, a character string to be manually entered can be correctly recognized.

16 Claims, 2 Drawing Sheets

(a)

(b)

(c)

ARTICLE WITH TWO OR MORE BAR CODES

TECHNICAL FIELD

The present invention relates to an article on which two or more bar codes are displayed. More precisely, the present invention relates to an article in which a display pattern of bar codes is designed so that when a character string represented by a bar code is entered by using keys upon read failure of the bar code or the like, the character string of the bar code to be entered should not be mistaken. The present invention is particularly useful when two or more bar codes are displayed on a surface of a material for packaging a photosensitive material.

RELATED ART

Since bar codes can correctly and rapidly convey information in a convenient manner, they are widely used by being displayed on surfaces of articles. Since some articles may need to convey a large quantity of information, many articles are seen on which two or more bar codes are displayed (for example, Japanese Patent Laid-open Publication (Kokai) No. 2003-203210, FIG. 2; No. 2003-141474, FIG. 3; No. 2001-43308, FIG. 1; and No. 2001-297168, FIG. 9). As for standardized articles, in particular, a bar code is displayed at a specific position on such an article, the article is positioned, and then the bar code is scanned and read with an automatic reader to efficiently read the bar code information.

However, read failure of a bar code may occur due to damage to a bar code displayed on an article or trouble in the bar code reader. Once read failure occurs, it is common to remove the article from the automatic reader and manually enter a character string represented by the bar code by using a keyboard or the like.

SUMMARY OF THE INVENTION

In such a case as described above, if two or more bar codes are displayed on an article, it is impossible to immediately recognize which character string among those corresponding to the bar codes should be manually entered. Therefore, a problem may be caused by mistakenly entering a character string that should not be entered. An object of the present invention is to solve such a problem of incorrect entry.

That is, an object of the present invention is to make it possible to correctly recognize a character string that should be manually entered upon seeing an article on which two or more bar codes and two or more character strings corresponding thereto are displayed. The object of the present invention is, in particular, to make it possible to correctly recognize a character string to be entered by using keys when read failure occurs in an automatic reader.

The inventors of the present invention assiduously studied in order to achieve the above object. As a result, they achieved the object by providing the article of the present invention having the following configurations.

(1) An article on which a first bar code coding a first character string and a second bar code coding a second character string are displayed, wherein the first character string is displayed in the vicinity of the first bar code in a state that the first character string can be readily recognized as a character string represented by the first bar code, and all or a part of the second character string is displayed in a state that it cannot be readily recognized as all or a part of a character string represented by the second bar code.

(2) The article according to (1), wherein the first character string is displayed at a position above or below the first bar code.

(3) The article according to (1) or (2), wherein all or a part of the second character string is not displayed at a position above or below the second bar code.

(4) The article according to any one of (1) to (3), wherein all or a part of the second character string is displayed at a position 10 cm or longer away from the second bar code.

(5) The article according to any one of (1) to (4), wherein all or a part of the second character string is divided and displayed at two or more sites.

(6) The article according to (5), wherein all or a part of the second character string is divided and displayed in two or more lines.

(7) The article according to (5) or (6), wherein all or a part of the second character string is divided and displayed at two or more sites which are remote from each other.

(8) The article according to any one of (1) to (7), wherein all or a part of the second character string is displayed with an additional dummy character that cannot be entered when the second character string is entered.

(9) The article according to (8), wherein the second character string contains two or more pieces of information, and the dummy character is inserted at a position or positions at which two or more pieces of information are partitioned.

(10) The article according to any one of (3) to (9), wherein a part of the second character string is displayed.

(11) The article according to any one of (3) to (10), wherein a third bar code coding a third character string is displayed, and the third character string is not displayed.

(12) The article according to any one of (3) to (10), wherein a third bar code coding a third character string is displayed, and all or a part of the third character string is displayed in a state that it cannot be readily recognized as all or a part of a character string represented by the third bar code.

(13) The article according to any one of (1) to (12), wherein a first label on which the first bar code and the first character string are printed and a second label on which the second bar code is printed are stuck.

(14) The article according to (13), wherein all or a part of the second character string is printed on the first label.

(15) The article according to any one of (1) to (14), wherein the article is a light-shielding packaging bag for packaging a protection cover containing two or more stacked sheet-like photosensitive materials.

(16) The article according to (15), wherein the first label is stuck on one surface of the light-shielding packaging bag, and the second label is stuck on the opposite surface of the bag.

Even when read failure of a bar code occurs, a character string to be manually entered can be correctly recognized on an article on which bar codes and character strings are displayed according to the present invention. The present invention is effective, in particular, when read failure occurs in an automatic reader, and on which bar code among two or more bar codes the read failure occurs cannot be immediately recognized.

BRIEF EXPLANATION OF THE DRAWINGS

FIG. 1(a)-(c) show schematic views of a specific embodiment of the article of the present invention.

BEST MODE FOR CARRYING OUT THE INVENTION

Figure 1:
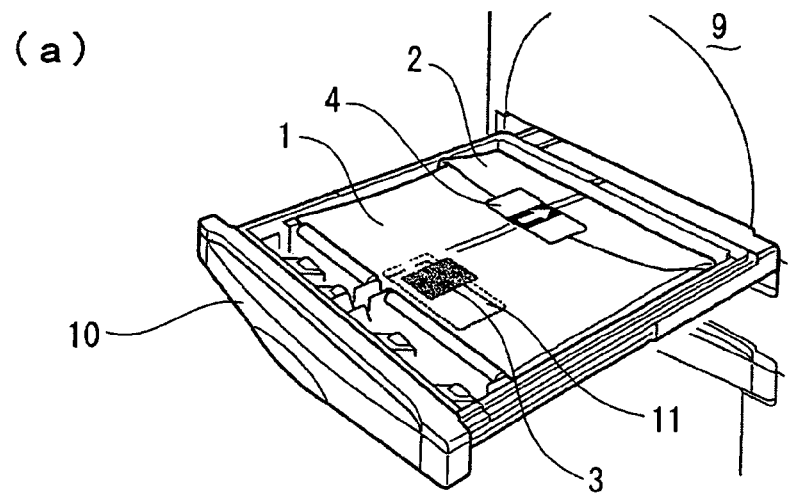
FIG. 1 shows a schematic view of a specific embodiment of the article of the present invention.
Figure 1:
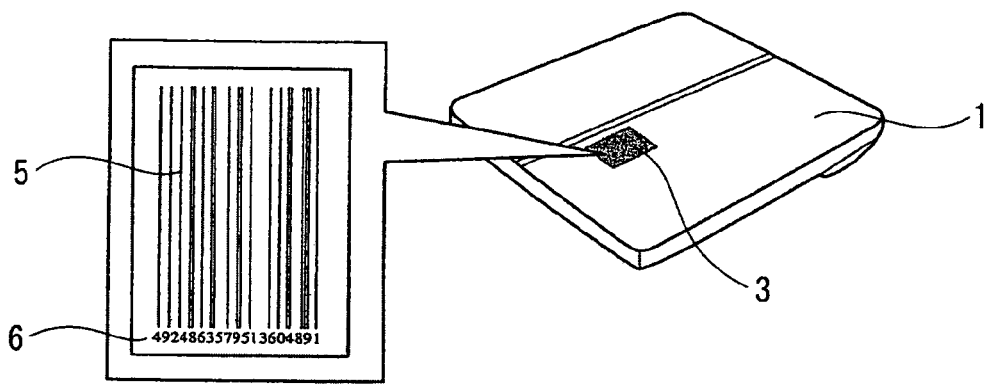
Figure 1:
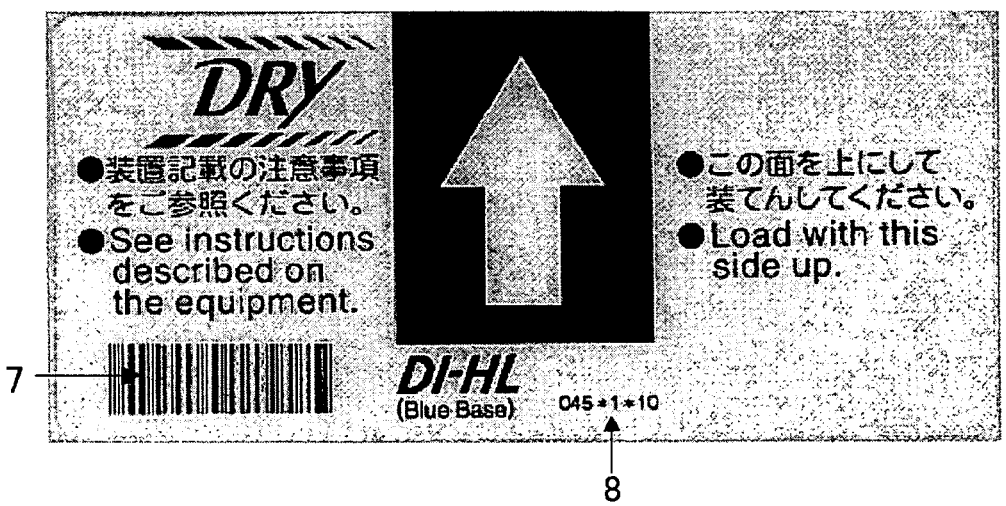

The article of the present invention will be explained in detail hereafter. In the present specification, ranges indicated with "to" mean ranges including the numerical values before and after "to" as the minimum and maximum values, respectively.

The article of the present invention on which two or more bar codes are displayed is characterized in that a first character string is displayed in the vicinity of a first bar code in a state that the first character string can be readily recognized as a character string represented by the first bar code, and all or a part of a second character string is displayed in a state that it cannot be readily recognized as all or a part of a character string represented by the second bar code.

In the specification, the expression "a state that the first character string can be readily recognized as a character string represented by the first bar code" means a state that the first bar code and the first character string are displayed so that they should be closely associated, and the first character string can be apparently recognized as a character string represented by the first bar code. Recently, a method is generally adopted in which a character string is displayed above or below a bar code to indicate that the bar code codes the character string. Therefore, if a bar code and a character string are displayed in such a manner, it is considered that they are displayed in a state that "the character string is readily recognized as a character string represented by the bar code". Further, even when the character string is not displayed above or below the bar code, but if the bar code and the character string are linked with an arrow, note or the like so that the relationship between the character string and the bar code coding can be understood at a glance, it is also considered that they are displayed in "a state that the character string can be readily recognized as a character string represented by the first bar code". Examples of such a case include, for example, a case where a character string is display on the right or left side of a bar code together with a note that "if this bar code fails to be read, enter the following character string by using keys".

Further, the expression "a state that all or a part of the second character string is displayed in a state that it cannot be readily recognized as all or a part of a character string represented by the second bar code" means that all or the part of the second character string is displayed in a state that all or the part of the second character string cannot be immediately recognized as all or a part of a character string represented by the second bar code. Examples of such a case include, for example, a case where all or a part of the second character string is displayed at a position sufficiently away from the second bar code, and therefore the relationship between them cannot be immediately recognized. In such a case, the distance between the bar code and the character string can be set to be, for example, 10 cm or longer, preferably 15 cm or longer, more preferably 20 cm or longer. Further, even when the distance is short, a case where all or a part of the second character string and the second bar code are displayed on different surfaces, and thus the relationship between them cannot be immediately recognized is encompassed in the state that "the relationship cannot be readily recognized". Examples of such a case include, for example, a case where all or a part of the second character string is displayed on the front surface, and the second bar code is displayed on the back surface.

Another example is a case where all or a part of the second character string is divided and displayed at two or more sites. Examples of such a case include, for example, a case where a character string consisting of 12 characters is divided into 3 portions of 4 characters, and each portion is displayed at a different place. Further, the divided characters may be displayed at one site as different lines. Examples of such a case include, for example, a case where the first 4 characters are displayed on the first line, the next 4 characters are displayed on the second line, and the last 4 characters are displayed on the third line. The number of characters on each line may vary. The display method is not particularly limited so long as the method is not a method generally used as a method for displaying a character string represented by a bar code, and a key operator cannot immediately recognize the character string as a character string represented by the bar code.

Further, another example is a case where all or a part of the second character string is displayed with an additional dummy character that cannot be entered when the second character string is entered. The dummy character is selected from characters that cannot be entered with an input means used to manually enter the character string. For example, when the input means is a keyboard, a character that cannot be entered by using the keyboard is selected as a dummy character. For example, when asterisk (*), hash mark (#) and at mark (@) cannot be entered from a keyboard, these can be selected as dummy characters, and displayed in all or a part of the second character string.

When the second character string contains two or more pieces of information, it is convenient that a dummy character(s) is inserted at a position or positions where the two or more pieces of information are partitioned. For example, when a character string is assumed in which the first information is represented by 4 characters, the second information is represented by 2 characters, and the third information is represented by 5 characters, it is convenient that a dummy character is inserted at a position at which the first information and the second information are partitioned (between the 4th character and the 5th character) and a position at which the second information and the third information are partitioned (between the 6th character and the 7th character). If a specific user knows that such a display method is adopted, the user can rapidly obtain necessary information when it is required. Content and type of the "information" referred to in the present specification are not particularly limited. For example, information of lot number, material, date of manufacture, place of manufacture, person in charge of manufacture and so forth can be incorporated into a bar code or a character string as information as required.

The methods for displaying all or a part of the second character string described above can be optionally used in combination. For example, a dummy character may be inserted into all or a part of the second character string, and further the second character string may be displayed away from the second bar code. Further, all or a part of the second character string inserted with a dummy character may be displayed in two or more lines.

Three or more bar codes may be displayed on the article of the present invention. For example, in addition to the aforementioned first bar code and corresponding character string and the aforementioned second bar code and corresponding character string, a third bar code coding a third character string may be displayed. In such a case, the character string represented by the third bar code may be or may not be displayed. Further, all or a part of the character string represented by the third bar code may be displayed. In such a case, all or a part of the third character string is displayed in a state that all or the part of the third character string cannot be readily recognized as all or a part of a character string represented by the third bar code. By employing such a display method, even if the first bar code fails to be read, the operator manually entering characters can correctly and rapidly recognize the first character string.

Further, 4 or more bar codes may be displayed on the article of the present invention. The 4th bar code and the corresponding character string as well as those after them can be handled in the same manner as the aforementioned third bar code and the corresponding character string.

In the present invention, bar codes and character strings may be directly printed on an article, or a label on which the bar codes and the character strings are printed may be stuck on the article. Further, two or more types of labels may be prepared and stuck on one article. Examples of such a case include, for example, an embodiment in which a first label on which a first bar code and a first character string are printed and a second label on which a second bar code is printed are prepared, and these labels are stuck on the article surface with a distance. In this embodiment, all or a part of the second character string represented by the second bar code may be printed on the second label with suitably inserted dummy characters or in different lines.

Size and color of bar codes and character strings displayed on the article of the present invention, material of label, article and so forth are not particularly limited so long as the object of the present invention can be achieved. Further, type and configuration of the bar code, character type to be expressed and so forth are not particularly limited either. For example, ITF, code 128 and so forth can be used.

The present invention is useful when one specific bar code (first bar code) fails to be read among two or more bar codes, and thus a manual operator is required to rapidly and correctly recognize the first character string represented by the first bar code. For example, the present invention is useful when a system is adopted in which a first bar code displayed at a specific position on an article is read by an automatic reader, and it may become necessary to manually enter a first character string represented by the first bar code due to read failure. In particular, when the operator cannot immediately recognize which bar code fails to be read among two or more bar codes displayed on the article, the present invention can be extremely effectively utilized.

When the first bar code fails to be read, the operator first checks the position of the bar code. At this time, even if the second bar code is identified first, the second character string represented by this bar code cannot be readily recognized. Therefore, the operator does not enter characters at this time point. Subsequently, when the operator turns his/her eyes to the first bar code, the operator realizes that the first character string is displayed so that it should be readily recognized, and thus the operator manually enters the first character string. Even if the operator looked at the first bar code first and then the second bar code, only the first character string can be still recognized as a character string that can be entered, and thus the operator manually enters the first character string as a result. Therefore, if bar codes and character strings are displayed according to the present invention, the operator does not incorrectly enter a character string even if the first bar code fails to be read.

As for the second bar code, it is essentially postulated that the aforementioned operator does not read the second bar code, or even if the operator reads it, the operator does not enter characters in the operator's own right when the second bar code fails to be read. For example, a consumer who purchases the article or a user of the article can be the operator. The second bar code is read or manually entered by a person who understands decisions about the display of the second bar code and the second character string, or under the direction of such a person. For example, the manufacturer of the article or a consumer service staff of the manufacturer can perform the operation. For example, information that is not directly needed when a customer or a user uses the article can be recorded in the second bar code. Specifically, processing history data during processing and packaging of the article or the like can be recorded and used for management of traceability.

The present invention can be widely utilized for articles on which two or more bar codes are displayed. Type, shape, material, size, color and so forth of the article to which the present invention is applied are not particularly limited. The term "article" used in the present specification also encompasses packaging means such as packaging containers and packaging bags, and it may or may not include contents. Further, the term "article" used in the present specification also encompasses tags and boards.

For example, the present invention can be preferably utilized for an article in which two or more sheet-like recording materials are packaged. Above all, the present invention can be preferably utilized for an article in which a sheet-like photosensitive material such as a sheet-like photothermographic material or a sheet-like thermal recording material is packaged. Specifically, the present invention can be utilized for any of protection covers (protective carrier) containing stacked sheets of two or more of stacked sheet-like photosensitive materials, a light-shielding packaging bag for packaging the whole protection cover containing stacked sheets, a packaging box (presentation box) housing the above packaging bag and a cardboard box housing two or more of packaging boxes.

Inter alia, the present invention can be particularly preferably utilized for a light-shielding packaging bag for packaging a protection cover containing stacked sheets, As for specific embodiments thereof and use thereof in a heat developing apparatus including a bar code reader, the examples described below can be referred to. As for information to be recorded in the bar code and recording methods, Japanese Patent Laid-open Publication Nos. 2003-191918 and 2003-186153 can be referred to.

The characteristics of the present invention will be more specifically explained with reference to the following examples. The shapes, dimensions, display patterns, way of utilization and so forth mentioned in the examples below can be optionally changed unless they depart from the scope of the invention. Therefore, the scope of the present invention should not be construed in any limitative way on the basis of the following specific examples.

EXAMPLE 1

A protection cover containing two or more sheet-like photothermographic materials was put in a light-shielding packaging bag 1 shown in FIG. 1(*a*), a fin 2 was folded, a second label 4 (146 mm×68 mm) was stuck, and the bag was sealed. A first label 3 was stuck on the back surface of this light-shielding packaging bag 1 as shown in FIG. 1(*b*). A first bar code 5 and a first character string 6 represented by the bar code were displayed on the first label 3 as shown in FIG. 1(*b*). Further, a second bar code 7 was displayed on the second label 4 as shown in FIG. 1 (*c*). A second character string (045110) represented by the second bar code and inserted with two asterisks as a part of the character string was displayed at the position 8 shown in FIG. 1(*c*). Because the character string (045110) consists of 3 information portions of (045), (1) and (10), the asterisks were inserted at positions partitioning the information portions.

This light-shielding packaging bag was loaded on a tray 10 of a heat developing apparatus 9 (product name: DRYPIX 7000, Fuji Photo Film Co., Ltd.) provided with an automatic bar code reading function as shown in 1(*a*) with the second label 4 on the upper side, and the tray 10 was housed in the heat developing apparatus. In the heat developing apparatus, the first bar code 5 displayed on the first label 3 was read by a bar code reader 11 installed at a position corresponding to the first label 3 below the tray.

Subsequently, a packaging bag 1 on which the first bar code 5 displayed on the first label 3 was intentionally stained was prepared and similarly loaded on the tray 10 of the heat developing apparatus 9, and the tray 10 was housed in the heat developing apparatus. The bar code reader 11 failed to read the bar code, and a display notifying a read error was indicated on the panel of the heat developing apparatus 9 to request to manually enter a character string represented by the bar code. The user removed the tray 10 from the heat developing apparatus and searched a character string represented by the second bar code displayed on the second label stuck on the upper side of the packaging bag 1. However, since the user could not recognize the corresponding character string, the user checked the back surface of the packaging bag 1 and found the first character string 6 displayed under the first bar code 5 displayed on the first label. By entering the first character string 6 using keys, loading the packaging bag 1 on the tray 10 again and housing the tray 10 in the heat developing device, the heat developing apparatus started operating normally. In this operation, an asterisk could not be entered from a touch panel installed in the heat developing apparatus for entry by using keys.

EXAMPLE 2

The display of the second label used in Example 1 was changed. The asterisks were not inserted into the second character string (045110) as a part of the character string, and a line was fed for each information portion (045), (1) and (10) so as to display the second character string in 3 lines as shown below. The display position was a position corresponding to the position 8 in FIG. 1(*c*).
045
1
10

EXAMPLE 3

Figure 2:
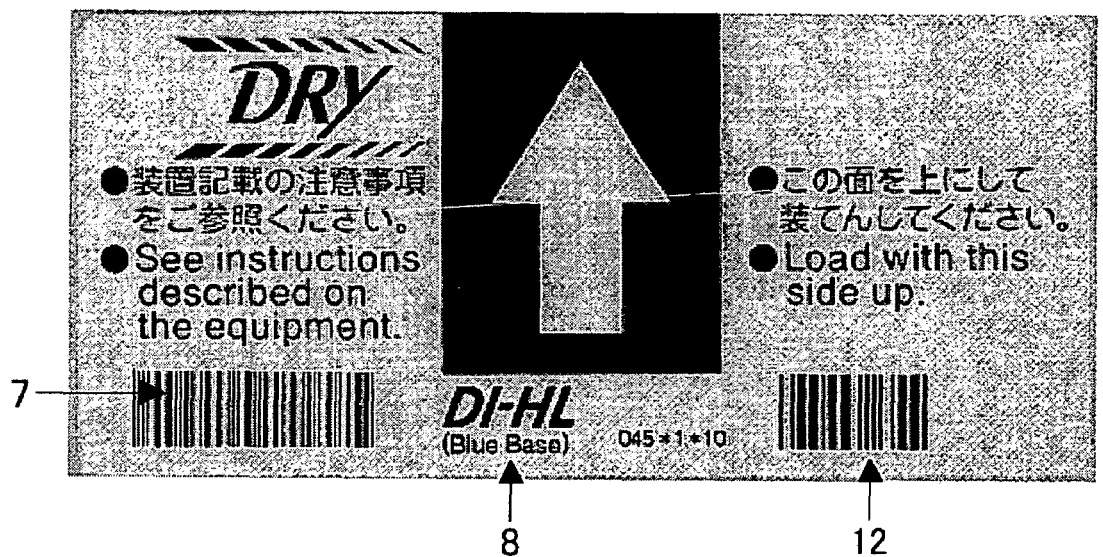

The display of the second label used in Example 1 was changed as shown in FIG. 2. That is, a third bar code 12 was displayed in a lower right region of the second label 4. A character string represented by this bar code was not displayed on the second label.

The present disclosure relates to the subject matter contained in Japanese Patent Application No. 284002/2003 filed on Jul. 31, 2003, which is expressly incorporated herein by reference in its entirety.

The foregoing description of preferred embodiments of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention not be limited by the specification, but be defined claims set forth below.

What is claimed is:

1. An article on which a first bar code coding a first character string and a second bar code coding a second character string are displayed, wherein the first character string is displayed in a vicinity of the first bar code in a state that the first character string can be readily recognized as a character string represented by the first bar code, and all or a part of the second character string is displayed in a state that it cannot be readily recognized as all or a part of a character string represented by the second bar code.

2. The article according to claim 1, wherein the first character string is displayed at a position above or below the first bar code.

3. The article according to claim 1, wherein all or a part of the second character string is not displayed at a position above or below the second bar code.

4. The article according to claim 3, wherein a part of the second character string is displayed.

5. The article according to any one of claims 3 to 4, wherein a third bar code coding a third character string is displayed, and the third character string is not displayed.

6. The article according to claim 3, wherein a third bar code coding a third character string is displayed, and all or a part of the third character string is displayed, and all or a part of the third character string is displayed in a state that it cannot be readily recognized as all or a part of a character string represented by the third bar code.

7. The article according to claim 1, where in all or a part of the second character string is displayed at a position 10 cm or longer away from the second bar code.

8. The article according to claim 1, wherein all or a part of the second character string is divided and displayed at two or more sites.

9. The article according to claim 8, wherein all or a part of the second character string is divided and displayed in two or more lines.

10. The article according to claim 8, wherein all or a part of the second character string is divided and displayed at two or more sites which are remote from each other.

11. The article according to claim 1, wherein all or a part of the second character string is displayed with an additional dummy character that cannot be entered when the second character string is entered.

12. The article according to claim 11, wherein the second character string contains two or more pieces of information, and the dummy character is inserted at a position or positions at which two or more pieces of information are partitioned.

13. The article according to claim 1, wherein a first label on which the first bar code and the first character string are printed and a second label on which the second bar code is printed are stuck.

14. The article according to claim 13, wherein all or a part of the second character string is printed on the first label.

15. The article according claim 1, wherein the article is a light-shielding packaging protection cover containing two or more stacked sheet-like photosensitive materials.

16. The article according to claim 15, wherein the first label is stuck on one surface of the light-shielding packaging bag, and the second label is stuck on the opposite surface of the bag.

* * * * *